US010649077B2

(12) United States Patent
Tsukamoto

(10) Patent No.: US 10,649,077 B2
(45) Date of Patent: May 12, 2020

(54) DISTRIBUTED ANTENNA BASE STATION, MOBILE STATION, AND METHOD OF DISTANCE MEASUREMENT

(71) Applicant: MITSUBISHI ELECTRIC CORPORATION, Tokyo (JP)

(72) Inventor: Kaoru Tsukamoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/462,900

(22) PCT Filed: Jan. 27, 2017

(86) PCT No.: PCT/JP2017/002922
§ 371 (c)(1),
(2) Date: May 21, 2019

(87) PCT Pub. No.: WO2018/138867
PCT Pub. Date: Aug. 2, 2018

(65) Prior Publication Data
US 2020/0072961 A1 Mar. 5, 2020

(51) Int. Cl.
*H04W 24/00* (2009.01)
*G01S 13/76* (2006.01)
*H04W 88/08* (2009.01)

(52) U.S. Cl.
CPC ........... *G01S 13/76* (2013.01); *H04W 88/085* (2013.01)

(58) Field of Classification Search
CPC .................. G01S 13/76; H04W 88/085
(Continued)

(56) References Cited

U.S. PATENT DOCUMENTS

| 8,838,137 B2 * | 9/2014 | Bhattacharya ........ H04W 64/00 455/456.1 |
| 2005/0003827 A1 * | 1/2005 | Whelan ................. H04W 16/10 455/454 |

(Continued)

FOREIGN PATENT DOCUMENTS

| JP | 2-145986 A | 6/1990 |
| JP | 4-345572 A | 12/1992 |

(Continued)

OTHER PUBLICATIONS

Fukuda et al., "Development of Train Location Detection Methods for Signalling", Railway Technical Research Institute (RTRI) Report, vol. 27, No. 9, Sep. 2013, total of 16 pages.

(Continued)

*Primary Examiner* — Amancio Gonzalez
(74) *Attorney, Agent, or Firm* — Birch, Stewart, Kolasch & Birch, LLP

(57) ABSTRACT

There are provided a signal transmitter that generates a signal indicating execution of distance measurement and transmits the signal to a plurality of antennas, a combiner that adds a plurality of received signals that are radio signals including a response signal from the mobile station and each of which is correspondingly received by each of the antennas, a timing detector that detects a timing at which reception power for a signal added by the combiner is maximized and determines a reception timing of the response signal, a base station time calculator that determines a round trip time from transmission of the signal indicating execution of distance measurement to reception of the response signal on the basis of the reception timing and a timing of the transmission of the signal indicating execution of distance measurement, a power detector that identifies one of the antennas that has received a received signal with highest reception power among the plurality of received signals, and (Continued)

a distance calculator that calculates a distance between the distributed antenna base station and the mobile station on the basis of the round trip time, a delay in signal transmission to the antenna identified by the power detector, and a distance to the identified antenna.

10 Claims, 3 Drawing Sheets

(58) Field of Classification Search
USPC .................................................. 455/456.5
See application file for complete search history.

(56) References Cited

U.S. PATENT DOCUMENTS

2010/0210283 A1   8/2010   Hoshino et al.
2019/0285722 A1*  9/2019   Markhovsky ........... G01S 19/05

FOREIGN PATENT DOCUMENTS

JP      5052244 B2    10/2012
JP      5150553 B2    2/2013

OTHER PUBLICATIONS

International Search Report for PCT/JP2017/002922 (PCT/ISA/210) dated Apr. 11, 2017.
Japan Notification of Reasons for Refusal issued in the corresponding Japanese Application No. 2017-532201 dated Aug. 15, 2017.
Nishimoto et al., "A Proposal for Millimeter-wave Linear Cell Concept Enabling High-speed Land-mobile Communications", Institute of Electronics, Information and Communication Engineers (IEICE) General Conference, B-5-77, Mar. 10-13, 2015, total of 4 pages.

* cited by examiner

DISTRIBUTED ANTENNA BASE STATION, MOBILE STATION, AND METHOD OF DISTANCE MEASUREMENT

FIELD

The present invention relates to a technique for measuring a distance between a radio base station and a mobile terminal, and more particularly, to a technique of distance measurement performed by a radio base station including a plurality of distributed antennas.

BACKGROUND

There has been known a radio communication system configured in assuming that a base station performs radio communication with a mobile terminal (mobile station) included in a device that travels on a predetermined route, such as a train and an automobile. As a method of configurating such a radio communication system, there has been proposed a method of configuring a communicable range (cell) in an elongated shape along a traveling route with a plurality of directional beams using a distributed antenna base station to which a plurality of directional antennas, which is distributed along the traveling route of a mobile device (mobile station), is connected (Non Patent Literature 1). When the shape of the cell is formed to be elongated along the traveling route, a cell length can be increased while interference with another radio communication system is suppressed. Such a distributed antenna system can be implemented in a form in which a plurality of antennas is arranged from one communication modem using a transmission medium such as an optical fiber.

Meanwhile, there has been known a method of measuring (ranging) a distance between a base station and a mobile station as a method of detecting a location of a mobile device, such as detection of a traveling location of a train. As such a method of measuring a distance, there has been known a method of measuring a distance from the time required for communication between a radio device of the distance measuring side (e.g., base station) and a radio device of the distance measured side (e.g., mobile station) (Non Patent Literature 2).

CITATION LIST

Non Patent Literature

Non Patent Literature 1: Hiroshi NISHIMOTO, et al., "A Proposal for Millimeter-wave Linear Cell Concept Enabling High-speed Land-mobile Communications", Institute of Electronics, Information and Communication Engineers (IEICE) General Conference, B-5-77, March 2015

Non Patent Literature 2: Mitsuyoshi FUKUDA, et al., "Development of Train Location Detection Methods for Signaling", Railway Technical Research Institute (RTRI) Report, Vol. 27, No. 9, September 2013

SUMMARY

Technical Problem

However, when the distributed antenna base station described above measures the distance to the mobile station using the conventional method of distance measurement mentioned above, there is a problem in that measurement cannot be performed accurately. When the distributed antenna base station transmits signals to a mobile station using a plurality of antennas, an amount of transmission delay between the base station and each of the antennas is adjusted such that each of the signals transmitted from the plurality of antennas reaches the mobile station substantially simultaneously. Here, "substantially simultaneously" indicates reaching within the range of the difference in maximum delay of a multipath allowed by the mobile station. For example, when orthogonal frequency division multiplexing (OFDM) is used as a communication method, the amounts of transmission delay are adjusted such that the signals arrive within the range of guard interval time.

In such a case, in the mobile station, a shift in the difference in maximum delay occurs between the timing of the signal received at the earliest (preceding wave timing) and the timing of the signal received at the latest (delay wave timing). In the case where distance measurement is performed at the preceding wave timing and in the case where distance measurement is performed at the delay wave timing, a difference expressed as a difference in maximum delay×a light speed is generated in a result of the distance measurement, whereby accurate measurement is difficult. For example, when the difference in maximum delay is 10 microseconds, the difference in the distance measurement result is about 3,000 m at a maximum.

The present invention has been made in view of the above, and an object of the present invention is to provide a distributed antenna base station and a mobile station capable of configuring a distributed radio antenna system in which a distance to a mobile station can be more accurately measured.

Solution to Problem

A distributed antenna base station according to an aspect of the present invention, to which a plurality of distributed antennas installed along a traveling route of a mobile station is connected, which communicates with the mobile station in a communicable range formed by the plurality of antennas, includes: a signal transmitter that generates a signal indicating execution of distance measurement and transmits the signal to the plurality of antennas; a combiner that adds a plurality of received signals that are radio signals including a response signal to the signal indicating execution of distance measurement from the mobile station and each of which is correspondingly received by each of the antennas; a timing detector that detects a timing at which reception power for a signal added by the combiner is maximized and determines a reception timing of the response signal; a base station time calculator that determines a round trip time from transmission of the signal indicating execution of distance measurement to reception of the response signal on the basis of the reception timing and a timing of the transmission of the signal indicating execution of distance measurement; a power detector that identifies one of the antennas that has received a received signal with highest reception power among the plurality of received signals; and a distance calculator that calculates a distance between the distributed antenna base station and the mobile station on the basis of the round trip time, a delay in signal transmission to the antenna identified by the power detector, and a distance between the distributed antenna base station and the identified antenna.

A mobile station according to another aspect of the present invention to be used in a distributed antenna radio system in which, in a communicable range formed by a plurality of distributed antennas installed along a traveling route of the mobile station, a base station connected to the plurality of antennas communicates with the mobile station, includes: a timing detector that detects a timing at which reception power for received signals that are obtained by receiving signals, which are transmission signals from the base station including a signal indicating execution of distance measurement and wirelessly transmitted by the plurality of antennas, is maximized and that detects reception of the signal indicating execution of distance measurement; and a signal transmitter that transmits, upon detection of the reception of the signal indicating execution of distance measurement, a response signal in response to the detected signal.

A method of distance measurement according to still another aspect of the present invention for measuring, in a distributed antenna radio system in which a distributed antenna base station communicates with a mobile station in a communicable range formed by a plurality of distributed antennas installed along a traveling route of the mobile station, a distance between the distributed antenna base station and the mobile station, by the distributed antenna base station being connected to the plurality of antennas, the method including: a step of generating a signal indicating execution of distance measurement and transmitting the signal to the plurality of antennas; a step of receiving a plurality of received signals that are radio signals including a response signal to the signal indicating execution of distance measurement from the mobile station and each of which is correspondingly received by each of the antennas; a step of adding the plurality of received signals; a step of detecting a timing at which reception power is maximized from a signal obtained by adding the plurality of received signals; a step of determining a round trip time from transmission of the signal indicating execution of distance measurement to reception of the response signal on the basis of the timing at which the reception power is maximized and a timing of the transmission of the signal indicating execution of distance measurement; a step of identifying one of the antennas that has received a received signal with highest reception power among the plurality of received signals; and a step of calculating a distance between the distributed antenna base station and the mobile station on the basis of the round trip time, a delay in signal transmission to the identified antenna, and a distance between the distributed antenna base station and the identified antenna.

Advantageous Effects of Invention

According to the present invention, the distributed antenna base station can more accurately measure the distance to the mobile station.

DESCRIPTION OF EMBODIMENTS

Figure 1:
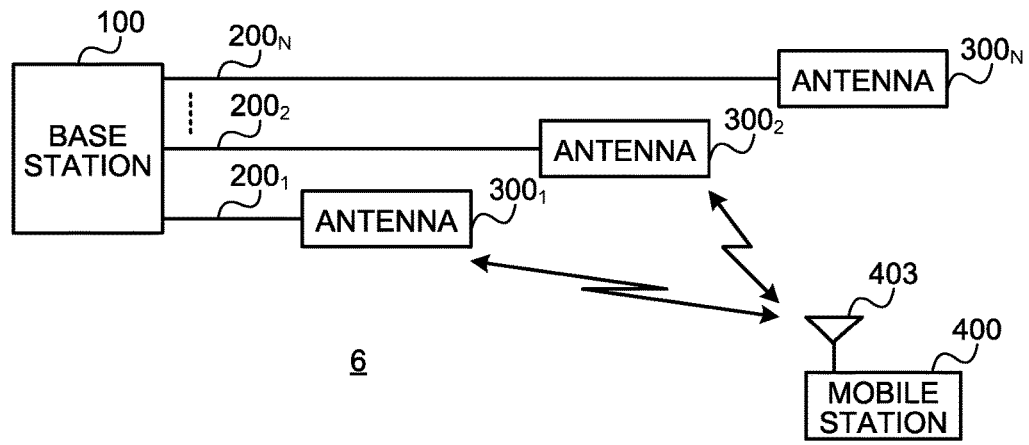
FIG. 1 is a block diagram illustrating an exemplary configuration of a distributed antenna radio system according to a first embodiment of the present invention.

Hereinafter, an embodiment of the present invention will be described in detail with reference to the accompanying drawings. Note that the present invention is not limited by this embodiment. The same or corresponding portions are denoted by the same reference signs in the drawings referred to in the following descriptions.

First Embodiment

FIG. 1 is a block diagram illustrating a configuration of a radio system 6 to which a base station (distributed antenna base station) according to a first embodiment of the present invention is applied. The radio system 6 is a distributed antenna radio system in which N (N is an integer of two or more) antennas $300_1$ to $300_N$ are connected to a base station 100, and a mobile station 400 communicates with the base station 100. Each of the antennas $300_1$ to $300_N$ is connected to the base station 100 via each of N signal lines $200_1$ to $200_N$. In the following descriptions, in the case where individual pieces of the N antennas $300_1$ to $300_N$ do not need to be distinguished, they may be indicated as an antenna 300 in some cases. The same will be applied to a signal line 200.

Each antenna 300 exchanges radio signals with an antenna 403 included in the mobile station 400. The frequency of the radio signals transmitted by each antenna 300 to the antenna 403 is the same. A traveling path of the mobile station 400 is defined, and the antenna 300 is installed along the traveling path of the mobile station 400. A communicable range (cell) of the base station 100 is formed in a shape along the traveling path of the mobile station 400 according to the communicable range of each antenna 300. The antenna 300 may be an antenna having no directivity, or may be a directional antenna forming directivity along the traveling path of the mobile station 400.

The signal line 200 may be any medium, such as a coaxial cable and an optical fiber, as long as it is a wired cable capable of transmitting a signal. The signal transmitted through the signal line 200 may be an analog signal or a digital signal. It is assumed that a delay in signal transmission between the base station 100 and each antenna 300 is adjusted such that the wirelessly transmitted signal reaches the antenna 403 of the mobile station 400 simultaneously. Here, "simultaneously" indicates that the difference in arrival time of the radio signal to the antenna is within the range of the difference in maximum delay in which the base station 100 and the mobile station 400 can be equalized.

Figure 2:
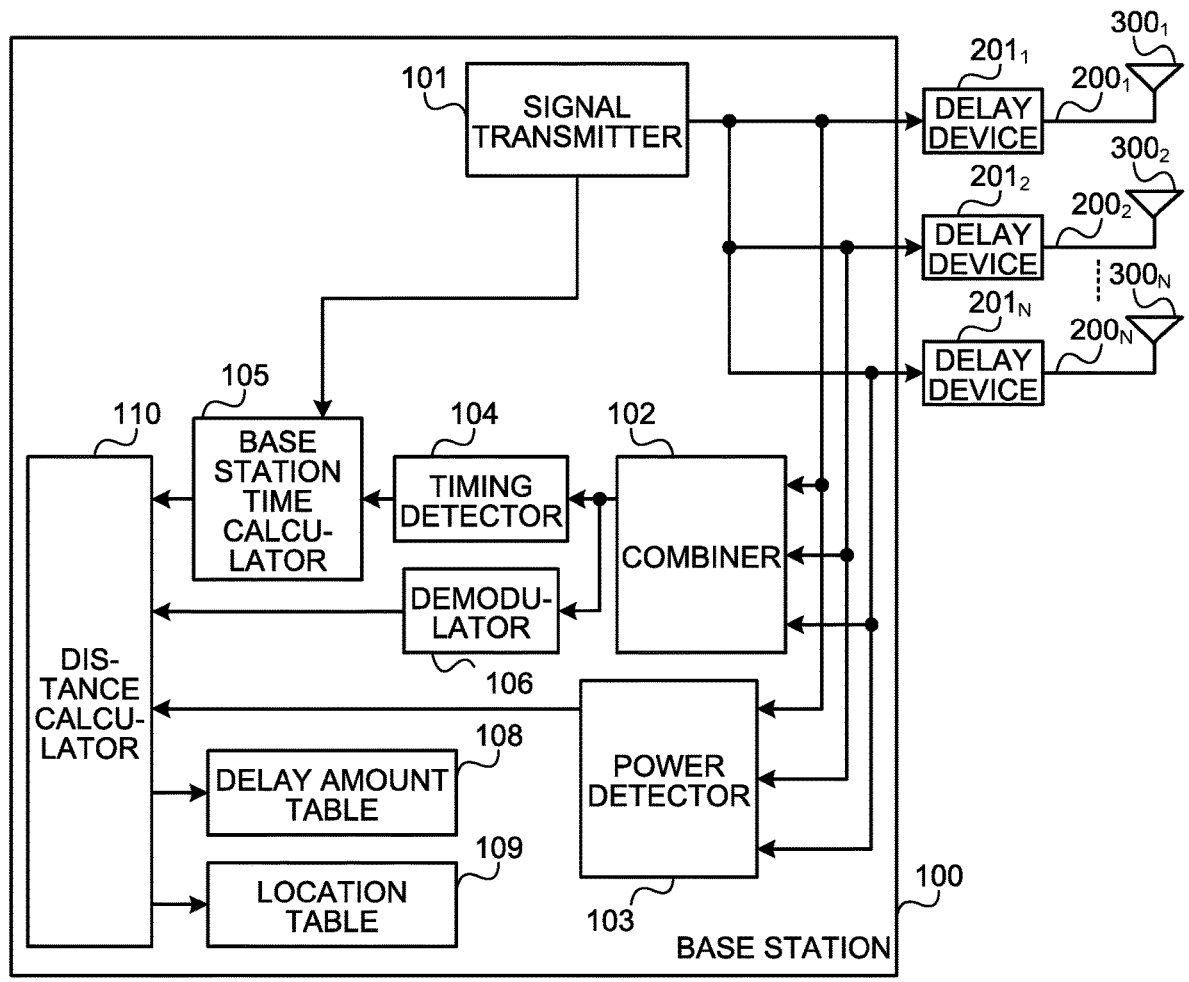
FIG. 2 is a block diagram illustrating an exemplary functional configuration of a base station according to the first embodiment of the present invention.

FIG. 2 is a block diagram illustrating an exemplary functional configuration of the base station 100 according to the first embodiment of the present invention. Note that the configuration used for normal radio communication with the mobile station 400 (configuration of digital-analog conversion, frequency conversion, etc.), which is not related to distance measurement, is not illustrated in FIG. 1 to simplify description. The base station 100 includes a signal transmitter 101, a combiner 102, a power detector 103, a timing detector 104, a base station time calculator 105, a demodulator 106, a delay amount table 108, a location table 109, and a distance calculator 110.

In FIG. 2, each antenna 300 wirelessly transmits a signal output from the base station 100, and receives a radio signal from the mobile station 400, which is a counterpart communication device, to input it to the base station 100. If a value "n" is an integer of one or more and N or less, each antenna 300$_n$ is connected to the base station 100 using a signal line 200$_n$ via a delay device 201n for adjusting an amount of transmission delay of a signal to be transmitted. Note that it can be configured without using a delay device 201 by adjusting the amount of delay of the transmitted signal by changing a line length of the signal line 200. FIG. 1 illustrates a system configuration without using the delay devices 201, and the configuration without including the delay devices is assumed in the following descriptions.

The signal transmitter 101 generates a ranging signal indicating execution of distance measurement according to a determined distance measurement timing, modulates the signal into a signal for radio transmission, and outputs it. Here, the ranging signal is a signal including a known signal (e.g., bit pattern), and the known signal may be a predetermined signal indicating that it is a ranging signal, may be a reference signal for equalization (pilot signal), or may be a unique word for slot detection. The modulated ranging signal output from the signal transmitter 101 is subject to processing (not illustrated) necessary for transmitting radio signals, such as digital-analog conversion and frequency conversion, and then input to each antenna 300 via the signal line 200. Note that the ranging signals input to antennas 300 are all the same signals.

The signal transmitter 101 outputs the timing (time) at which the ranging signal is output, to the base station time calculator 105 as a transmission timing. In the present embodiment, the ranging signal is transmitted via a dedicated transmission slot. Note that, the ranging signal may be used as a ranging signal by adding, to a part of other transmission data, an index indicating that it is a ranging signal, or all transmission signals may be treated as ranging signals. In the former case, the signal transmitter 101 performs processing of adding an index indicating that it is a ranging signal to a part of transmission data, and outputs the timing at which the processing is performed as a transmission timing. In the latter case, the signal transmitter 101 only needs to output the transmission timing. Here, the index indicating that it is a ranging signal can be obtained by setting one to a specific bit, for example.

When each antenna 300 transmits the ranging signal output from the base station 100 and the mobile station 400 receives the ranging signal, the mobile station 400 wirelessly transmits a response signal, as described later. The response signal includes a predetermined index indicating that it is a response to the ranging signal. Then, each antenna 300 receives the signal wirelessly transmitted by the mobile station 400, and inputs the received signal to the base station 100 via the signal line 200.

The combiner 102 adds a plurality of received signals input from the antennas 300 to the base station via the signal lines 200, and outputs the added received signals to the timing detector 104 and the demodulator 106. Note that, in the addition processing performed by the combiner 102, the received signal to be added may be an analog signal, or may be a digital signal having been subject to the analog-digital conversion (not illustrated). When the addition processing is performed in the state of the analog signal, the analog-digital conversion may be performed on the signal after the addition. Further, the received signal to be subject to the addition processing by the combiner 102 may be limited to a signal in which power of the received signal is equal to or more than a predetermined threshold value.

The timing detector 104 detects a timing (time) at which the reception power becomes maximum based on the received signal after the addition that is input from the combiner 102. This timing detection processing may be performed using a known method such as a method in which a replica (known signal replica) of a known signal included in the received signal is held in the timing detector 104, and cross correlation computing between the received signal after the addition and the replica of the known signal is performed to detect a correlative power peak. According to this processing, it becomes possible to detect the timing at which the base station 100 receives the response signal received by the antenna 300 corresponding to the cell in which the mobile station is located. The timing detector 104 outputs the timing at which the power of the detected received signal becomes maximum to the base station time calculator 105 as a reception timing (base station reception timing).

The base station time calculator 105 subtracts the time indicated by the transmission timing of the ranging signal input from the signal transmitter 101 from the time indicated by the reception timing input from the timing detector 104, thereby calculating the base station time $T_A$, which is the round trip time from the transmission of the ranging signal transmitted by the base station 100 to the reception of the response signal transmitted by the mobile station 400. The base station time calculator 105 outputs the base station time $T_A$ to the distance calculator 110. The demodulator 106 demodulates the received signal after the addition input from the combiner 102, and outputs it to the distance calculator 110. Note that the received signal includes mobile station time $T_B$, which will be described later.

The power detector 103 measures the reception power for each of the N received signals received by the antennas 300, and identifies the antenna that has received the received signal with the maximum reception power. Then, an antenna identifier k indicating the antenna is output to the distance calculator 110. Here, it is assumed that N antennas are numbered from 1 to N, and the number given to the identified antenna is output as the antenna identifier. Note that the antenna identifier is not necessarily numeric, and may be another kind of information as long as each antenna 300 can be identified. Measurement of the reception power performed by the power detector 103 may be performed on an analog signal, or may be performed on a digital signal. The measurement of the reception power may be performed by each antenna 300, and a result of the measurement may be input to the power detector 103 via the signal line 200, whereby the power detector 103 identifies the antenna 300 that has received the signal with the highest power. The measurement of the reception power may be performed using a publicly known method.

In the following descriptions, the antenna 300 corresponding to the antenna identifier k is referred to as an antenna 300$_k$. The delay amount table 108 is a table that holds a time required for signal transmission between the base station 100 and each antenna 300. This table can be prepared in advance by performing measurement at the time of installing the base station 100 and each antenna 300. Note that propagation time of a signal of each signal line 200 may be periodically measured to update the delay amount table 108. The distance calculator 110 searches the delay amount table 108 using the antenna identifier k output from the power detector 103 as a search key, thereby obtaining the transmission time between the base station 100 and the antenna 300$_k$.

Meanwhile, the location table 109 is a table that holds a distance between the base station 100 and each antenna 300. Here, the distance between the base station 100 and each antenna 300 is assumed as a length (mobile station path length) of traveling path of the mobile station in the case where the mobile station 400 communicating with the base station 100 travels from the location of the base station 100 to the location of the antenna 300. For example, in the case where the mobile station 400 is a train, the distance held in the location table 109 is the difference in kilometrage between the base station 100 and the antenna 300. This table can be prepared in advance by performing measurement at the time of installing the base station 100 and each antenna 300. The distance calculator 110 searches the location table 109 using the antenna identifier k output from the power detector 103 as a search key, thereby obtaining a distance $RD_k$ between the antenna $300_k$ and the base station 100.

The distance calculator 110 calculates, using a formula (1) set out below, R1 corresponding to a linear distance between the mobile station 400 and the antenna $300_k$ from a light speed (denoted by c), the base station time $T_A$ input from the base station time calculator 105, the mobile station time $T_B$ included in the response signal from the mobile station 400 input from the demodulator 106, and the transmission time (assumed to be $TC_k$) between the base station and the antenna $300_k$ obtained from the delay amount table 108.

[Formula 1]

$$R1 = \{T_A - (2 \times TC_k) + T_B\} \times c \div 2 \quad (1)$$

Note that the calculation of R1 may be performed using the following formula (2) in consideration of a delay amount $T_{RF}$ in the antenna $300_k$.

[Formula 2]

$$R1 = \{T_A - (2 \times TC_k) + T_B + 2 \times T_{RF}\} \times c \div 2 \quad (2)$$

In a case where a mobile station traveling path included in a communication area of a certain antenna 300 is a curve, the distance calculator 110 may hold a conversion table from which a traveling path length between the mobile station 400 and the antenna 300 can be obtained from a linear distance between the mobile station 400 and the antenna 300, and may update R1 using the traveling path length between the mobile station and the antenna 300 obtained by referring to the conversion table on the basis of R1 calculated according to the formulae (1) and (2). Note that this conversion table can also be obtained and held in advance in a similar manner to the location table and the like.

As will be described later, when the mobile station 400 and the base station share a fixed mobile station time $T_B$ and the response signal transmitted from mobile station 400 does not include $T_B$, the base station 100 performs a calculation of the formula (1) or the formula (2) using the mobile station time $T_B$ that is shared with the mobile station 400. Although the accuracy of the distance measurement is lowered, it is also conceivable to simplify the process by assuming that the mobile station time $T_B$ is zero.

The distance calculator 110 calculates, using the following formula (3), a distance R2 between the base station 100 and the mobile station 400 from the calculated R1 and the $RD_k$ that is obtained from the location table 109.

[Formula 3]

$$R2 = R1 + RD_k \quad (3)$$

Figure 3:
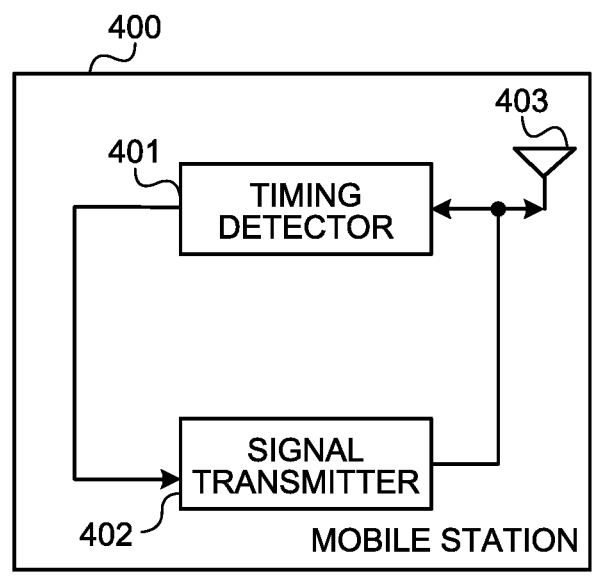
FIG. 3 is a block diagram illustrating an exemplary functional configuration of a mobile station according to the first embodiment of the present invention.

FIG. 3 is a block diagram illustrating an exemplary functional configuration of the mobile station 400 according to the first embodiment of the present invention. Note that only functional blocks specific to the present invention are illustrated in FIG. 3, and the radio communication functions of a normal mobile terminal is not illustrated in a similar manner to FIG. 2. The mobile station 400 includes a timing detector 401, a signal transmitter 402, and the antenna 403.

The antenna 403 receives a ranging signal wirelessly transmitted from the base station 100. Note that the signal received by the antenna 403 is a signal transmitted from one or more antennas among the plurality of antennas $300_1$ to $300_N$ connected to the base station 100, which is a mixed wave in which a preceding wave and a delay wave are mixed. The received signal received by the antenna 403 is subject to processing of receiving radio signals such as frequency conversion (not illustrated) and analog-digital conversion (not illustrated), and then input to the timing detector 401. In a similar manner to the timing detector 104 included in the base station 100, the timing detector 401 outputs, to the signal transmitter 402, the timing (time) at which the reception power becomes the highest as a reception timing of a ranging signal on the basis of cross correlation computing on a replica of a known signal included in the ranging signal.

When the notification of the reception timing of the ranging signal is received, the signal transmitter 402 generates and outputs a response signal. In a similar manner to the ranging signal, the response signal includes an index indicating that the signal is a response signal. Here, when outputting the response signal, the signal transmitter 402 sets, in a predetermined area of the response signal to be transmitted, a difference between the time at which the signal is output and the time indicated by the reception timing input from the timing detector 401 as a mobile station time $T_B$, and transmits the response signal. The mobile station time $T_B$ is a required time (difference in timing) from when the ranging signal is received by the mobile station 400 until when the response signal is transmitted.

Note that $T_B$ does not need to indicate time itself. For example, in a case where the difference in timing is Td, the difference in timing may be quantized and transmitted as a coded value, such as $T_B=0$ in the case of 0≤Td<t1 and $T_B=1$ in the case of t1≤Td<t2. In this case, the distance calculator 110 of the base station 100 may determine the actual time length by decoding the coded value in the mobile station time calculator 107. It is conceivable that the granularity of the quantization may be determined on the basis of the raging accuracy required by the system. In a system requiring distance measurement with precision of r meters, the granularity of the quantization is preferably less than r/c (light speed).

Note that the signal transmitter 402 may output the response signal after a predetermined fixed time has elapsed from the time at which the reception timing is input from the timing detector 401. In that case, the predetermined fixed time is set in a predetermined area of the transmission signal as a mobile station time $T_B$. Further, when the fixed time is shared between the base station 100 and the mobile station 400, it is not necessary to include the mobile station time $T_B$ in the response signal.

Figure 4:
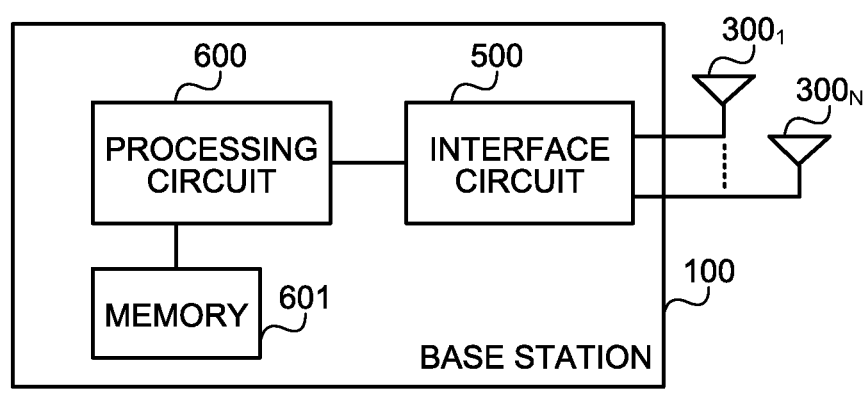
FIG. 4 is a block diagram illustrating an exemplary hardware configuration of the base station according to the first embodiment of the present invention.

FIG. 4 is a block diagram illustrating an exemplary hardware configuration of the base station 100 according to the present embodiment. In FIG. 4, the base station 100 includes a processing circuit 600, a memory 601, and an interface circuit 500. The components of the signal transmitter 101, the combiner 102, the power detector 103, the timing detector 104, the base station time calculator 105, the demodulator 106, and the distance calculator 110 illustrated in FIG. 2 are implemented by the processing circuit 600, and the delay amount table 108 and the location table 109 are implemented by the memory 601. The processing circuit 600 may be configured by a dedicated circuit such as an application specific integrated circuit (ASIC) and a field programmable gate array (FPGA). Alternatively, the processing circuit 600 can be implemented by a processor such as a general-purpose processor or a digital signal processor (DSP), hardware including a memory and peripheral circuits, and a program that is stored in the memory and operates on the processor. The memory 601 may be included in the processing circuit 600, that is, the memory 601 may be included in the ASIC or the FPGA, or may be included in the memory connected to the processor. Further, a part of the processing circuit 600 may be implemented by a dedicated circuit such as ASIC and FPGA, and another part thereof may be implemented by the processor and the program. The interface circuit 500 is a circuit having an interface function with the antenna 300, which is a circuit having functions such as digital-analog conversion and frequency conversion (not illustrated in FIG. 2). Note that the mobile station 400 can also be implemented with a similar hardware configuration.

Figure 5:
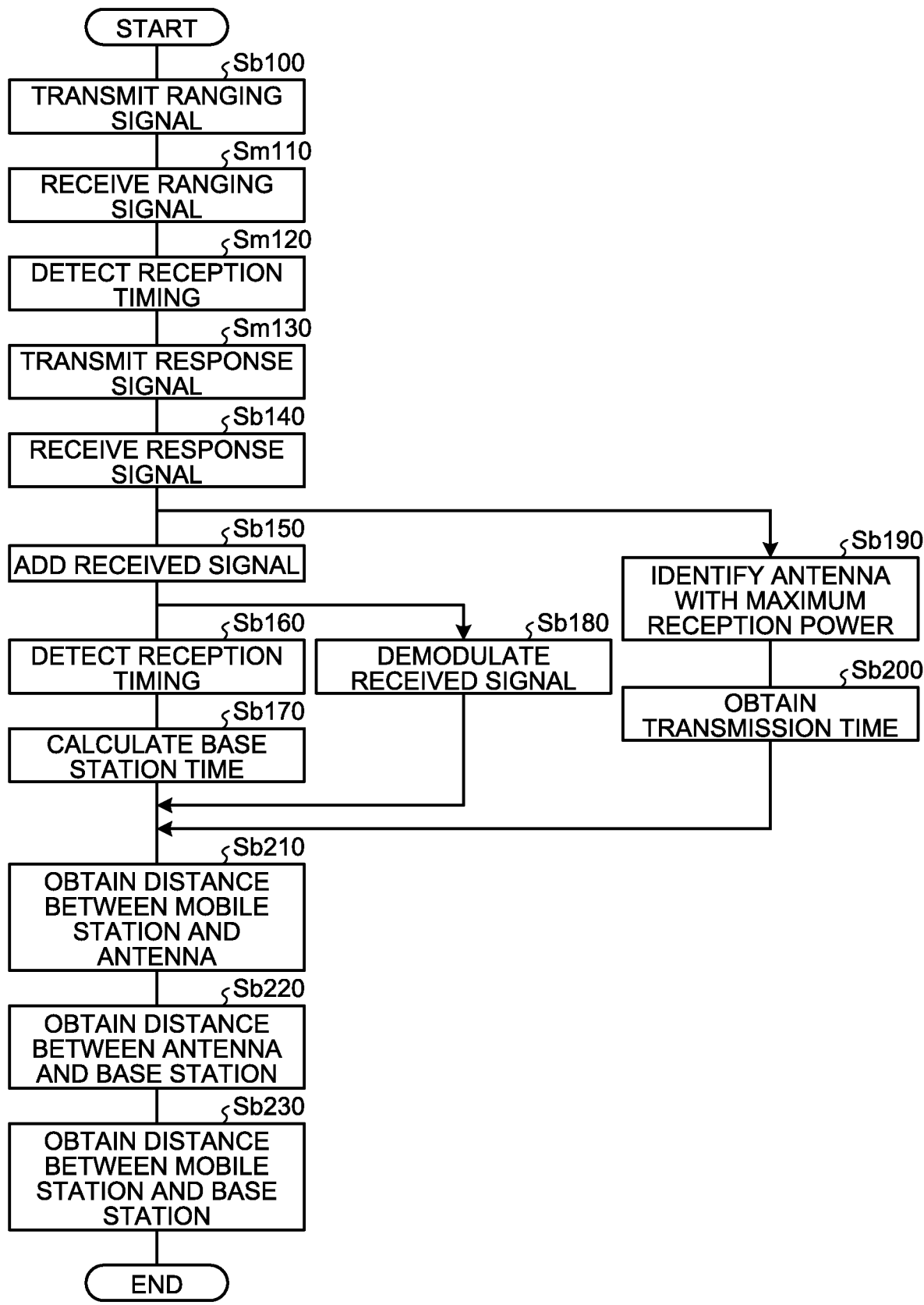
FIG. 5 is a flowchart illustrating an exemplary procedure of distance measurement between the base station and the mobile station in the distributed antenna radio system according to the first embodiment of the present invention.

Next, an operation flow of the base station 100 and the mobile station 400 in a distance measurement process will be specifically described with reference to the flowchart illustrated in FIG. 5. In the following descriptions, processing performed by the base station 100 is denoted by Sb, and processing performed by the mobile station is denoted by Sm.

First, the signal transmitter 101 of the base station 100 generates and outputs a ranging signal, and outputs the time of the output as a transmission timing (Sb100). The output ranging signal is transmitted to the mobile station 400 as a radio signal via a plurality of signal lines 200 and the antennas 300. The antenna 403 of the mobile station 400 receives the ranging signals transmitted from the antennas 300, and the received ranging signals are input to the timing detector 401 (Sm110). Next, the timing detector 401 of the mobile station 400 detects the reception timing of the ranging signals (Sm120). The reception timing is, among reception timings of the radio signals transmitted from a plurality of antennas 300, the reception timing of the radio signal that has arrived earlier than the other signals. Next, the signal transmitter 402 of the mobile station 400 determines the mobile station time $T_B$ that is a difference between the time indicated by the reception timing detected by the timing detector 401 and the time at which a response signal is transmitted, and outputs the response signal in which $T_B$ is set to a predetermined position of the transmission signal (Sm130).

The plurality of antennas 300 connected to the base station 100 receives the radio signal of the response signal transmitted from the mobile station 400, and each received signal is input to the base station 100 via the signal line 200. The received signal input to the base station 100 is input to the combiner 102 and the power detector 103 of the base station 100 (Sb140). The combiner 102 to which the received signals received by the plurality of antennas 300 are input adds the input received signals, and outputs the received signal after the addition (Sb150). Then, the timing detector 104 determines a reception timing (time) of the response signal from the received signal after the addition output from the combiner 102 (Sb160). Next, the base station time calculator 105 subtracts the time of the transmission timing output by the signal transmitter 101, from the time of the reception timing determined by the timing detector 104 and calculates the base station time $T_A$ (Sb170). The received signal after the addition output from the combiner 102 is also input to the demodulator 106, and the demodulator 106 demodulates the input received signal (Sb180).

Further, the power detector 103 measures the power of each of the input received signals, detects the antenna 300 corresponding to the received signal with the highest power, and outputs the antenna identifier k for identifying the detected antenna 300 (Sb190). Next, the distance calculator 110 refers to the delay amount table 108 on the basis of the antenna identifier k, and obtains the signal transmission time $TC_k$ between the antenna identified by the power detector 103 and the base station 100 (Sb200). Next, the distance calculator 110 obtains the distance R1 between the mobile station 400 and the identified antenna $300_K$ on the basis of the obtained signal transmission time $TC_k$, the base station time $T_A$ obtained by the base station time calculator 105, and the mobile station time $T_B$ included in the response signal demodulated by the demodulator 106 (Sb210).

Next, the distance calculator 110 refers to the location table 109 on the basis of the antenna identifier k, and obtains the distance $RD_k$ between the antenna identified by the power detector 103 and the base station 100 (Sb220). The distance calculator 110 then obtains the distance R2 between the mobile station 400 and the base station 100 on the basis of the distance R1 between the mobile station 400 and the identified antenna $300_k$ and the distance $RD_k$ between the identified antenna $300_k$ and the base station 100 (Sb230).

In the descriptions above, the process flow in which the processing of Sb150 to Sb170 and the processing of Sb180 are performed in parallel with the processing of Sb190 to Sb200, and the processing of Sb160 to Sb170 is performed in parallel with the processing of Sb180 has been described. However, the processing is not necessarily parallelized. The processing not parallelized in the descriptions above may be parallelized within a range in which the processing result does not change, or the order may be interchanged.

As described above, the base station according to the present embodiment outputs a ranging signal to a plurality of distributed antennas installed along the traveling path of the mobile station, each of the antennas constituting a cell, wirelessly transmits the ranging signal from each of the antennas, and receives input of a received signal of the response signal that is transmitted in response to the ranging signal from the mobile station and received by the plurality of antennas. The base station reception timing of the response signal received by the antenna corresponding to the cell in which the mobile station is located, is obtained on the basis of the reception power of the signal obtained by adding a plurality of input received signals. Further, the antenna corresponding to the cell in which the mobile station is located, is identified on the basis of the reception power of each received signal from the plurality of antennas, and the distance and the transmission time between the antenna and the base station are obtained. Then, the distance between the mobile station and the base station is obtained based on the base station reception timing, and the distance and the signal transmission time between the base station and the identified antenna. In a distributed antenna system in which a plurality of antennas is installed along a traveling path of a mobile station, a distance between a base station and a mobile station can be accurately measured even in a multipath environment in which a plurality of signals having different times of arrival at the mobile station exists.

The configuration described in the embodiment described above indicates an example of the content of the present invention. The configuration can be combined with another publicly known technique, and a part of the configuration can be omitted or changed without departing from the gist of the present invention.

INDUSTRIAL APPLICABILITY

As described above, the present invention is useful for radio communication performed by forming a linear cell with distributed antennas, and in particular, it is suitable for distance measurement between a base station and a mobile station that moves on a predetermined route.

REFERENCE SIGNS LIST 6 distributed antenna radio system; 100 base station (distributed antenna base station); 101 signal transmitter; 102 combiner; 103 power detector; 104 timing detector; 105 base station time calculator; 106 demodulator; 108 delay amount table; 109 location table; 110 distance calculator; 200, $200_1$ to $200_N$ signal line; 201, $201_1$ to $201_N$ delay device; 300, $300_1$ to $300_N$ antenna; 400 mobile station; 401 timing detector; 402 signal transmitter; 403 antenna; 500 interface circuit; 600 processing circuit; 601 memory.

The invention claimed is:

1. A distributed antenna base station, to which a plurality of distributed antennas installed along a traveling route of a mobile station is connected, that communicates with the mobile station in a communicable range formed by the plurality of antennas, the distributed antenna base station comprising:
    first processing circuitry
    to generate a signal indicating execution of distance measurement and transmit the signal to the plurality of antennas;
    to add a plurality of received signals that are radio signals including a response signal to the signal indicating execution of distance measurement from the mobile station and each of which is correspondingly received by each of the antennas;
    to detect a timing at which reception power for a signal added is maximized and determine a reception timing of the response signal;
    to determine a round trip time from transmission of the signal indicating execution of distance measurement to reception of the response signal on the basis of the reception timing and a timing of the transmission of the signal indicating execution of distance measurement;
    to identify one of the antennas that has received a received signal with largest reception power among the plurality of received signals; and
    to calculate a distance between the distributed antenna base station and the mobile station on the basis of the round trip time, a delay in signal transmission to the antenna identified, and a distance between the distributed antenna base station and the identified antenna.

2. The distributed antenna base station according to claim 1, wherein
    when the response signal including a required time from when the mobile station detects reception of the signal indicating execution of distance measurement until when the mobile station transmits the response signal is transmitted, the first processing circuitry calculates the distance on the basis of a time obtained by subtracting the required time from the round trip time.

3. The distributed antenna base station according to claim 1, wherein
    when a time from when the mobile station detects reception of the signal indicating execution of distance measurement until when the mobile station transmits the response signal is preset, the first processing circuitry calculates the distance on the basis of a time obtained by subtracting the preset time from the round trip time.

4. The distributed antenna base station according to claim 1, further comprising
    a memory to store a conversion table for converting a distance between the identified antenna and the mobile station determined on the basis of the round trip time into a traveling route length between the identified antenna and the mobile station, and wherein
    the first processing circuitry calculates the distance between the distributed antenna base station and the mobile station on the basis of the traveling route length obtained by referring to the conversion table and the distance between the distributed antenna base station and the identified antenna.

5. A mobile station communicates with the distributed antenna base station according to claim 1, the mobile station comprising:
    second processing circuitry
    to detect a timing at which reception power of signals wirelessly transmitted from the plurality of the antennas, for received signals that are obtained by receiving signals which are transmission signals from the distributed antenna base station including a signal indicating execution of the distance measurement and wirelessly transmitted by the plurality of antennas, is maximized and to detect reception of the signal indicating execution of distance measurement; and
    to transmit, upon detection of the reception of the signal indicating execution of distance measurement, a response signal in response to the detected signal at a transmission timing based on the timing detected.

6. The mobile station according to claim 5, wherein
    the second processing circuitry transmits the response signal after a predetermined fixed time has elapsed from the timing.

7. The mobile station according to claim 5, wherein
    the second processing circuitry transmits the response signal including time information based on a difference between a timing of transmitting the response signal and the timing detected.

8. A method of distance measurement for measuring, in a distributed antenna radio system in which a distributed antenna base station communicates with a mobile station in a communicable range formed by a plurality of distributed antennas installed along a traveling route of the mobile station, a distance between the distributed antenna base station and the mobile station, by the distributed antenna base station being connected to the plurality of antennas, the method comprising:
    generating a signal indicating execution of distance measurement and transmitting the signal to the plurality of antennas;
    receiving a plurality of received signals that are radio signals including a response signal to the signal indicating execution of distance measurement from the mobile station and each of which is correspondingly received by each of the antennas;
    adding the plurality of received signals;
    detecting a timing at which reception power is maximized from a signal obtained by adding the plurality of received signals;

determining a round trip time from transmission of the signal indicating execution of distance measurement to reception of the response signal, on the basis of the timing at which the reception power is maximized and a timing of the transmission of the signal indicating execution of distance measurement;

identifying one of the antennas that has received a received signal with highest reception power among the plurality of received signals; and calculating a distance between the distributed antenna base station and the mobile station on the basis of the round trip time, a delay in signal transmission to the identified antenna, and a distance between the distributed antenna base station and the identified antenna.

9. The distributed antenna base station according to claim 2, further comprising a memory to store a conversion table for converting a distance between the identified antenna and the mobile station determined on the basis of the round trip time into a traveling route length between the identified antenna and the mobile station, and wherein the first processing circuitry calculates the distance between the distributed antenna base station and the mobile station on the basis of the traveling route length obtained by referring to the conversion table and the distance between the distributed antenna base station and the identified antenna.

10. The distributed antenna base station according to claim 3, further comprising a memory to store a conversion table for converting a distance between the identified antenna and the mobile station determined on the basis of the round trip time into a traveling route length between the identified antenna and the mobile station, and wherein the first processing circuitry calculates the distance between the distributed antenna base station and the mobile station on the basis of the traveling route length obtained by referring to the conversion table and the distance between the distributed antenna base station and the identified antenna.

* * * * *